(12) United States Patent
Lewis (10) Patent No.: US 8,023,496 B2
(45) Date of Patent: Sep. 20, 2011

(54) SYSTEM AND A METHOD FOR CONSTRUCTING AND DECONSTRUCTING DATA PACKETS

(75) Inventor: Michael Lewis, Maersta (SE)

(73) Assignee: Infineon Technologies AG, Neubiberg (DE)

(*) Notice: Subject to any disclaimer, the term of this patent is extended or adjusted under 35 U.S.C. 154(b) by 1109 days.

(21) Appl. No.: 11/408,727

(22) Filed: Apr. 21, 2006

(65) Prior Publication Data

US 2006/0255979 A1 Nov. 16, 2006

(30) Foreign Application Priority Data

Apr. 22, 2005 (EP) .................................... 05008911

(51) Int. Cl.
H04J 3/06 (2006.01)
H04J 3/24 (2006.01)
H04J 3/00 (2006.01)
H04L 12/28 (2006.01)
H04L 12/56 (2006.01)
H04L 12/66 (2006.01)
H04B 1/38 (2006.01)

(52) U.S. Cl. ........ 370/352; 370/392; 370/463; 370/474; 370/475; 370/476

(58) Field of Classification Search .................. 370/352, 370/392, 463, 474–476; 455/560–561
See application file for complete search history.

(56) References Cited

U.S. PATENT DOCUMENTS 5,261,077 A * 11/1993 Duval et al. ................... 710/306
6,038,400 A * 3/2000 Bell et al. ........................ 710/11

OTHER PUBLICATIONS

Open Source Baseband Bluetooth Core, Apr. 22, 2003.*
"Bluetooth IP Core Specification", Jamil Khatib, Sep. 26, 2001, Opencores.Org., Internet: URL:http://custom.lab.unb.br/ub/hardware/opencores/bluetooth_bb/doc/Bluetooth.pdf, paragraph '02.5, 43 pgs.
"System design of Active Basestations based on dynamically reconfigurable hardware", Athanassios Boulis and Mani B. Srivastava, 2000, IEEE, Annual ACM IEEE Design Automation Conference, pp. 501-506.

* cited by examiner

Primary Examiner — Daniel J Ryman
Assistant Examiner — Nishant Divecha
(74) Attorney, Agent, or Firm — Eschweiler & Associates, LLC (57) ABSTRACT

A system for constructing and deconstructing data packets is disclosed, wherein the system is operable to support a number of different coding formats. The system comprises a processor means operatively coupled to a processor bus. A packet processing data path is attached to the processor bus as a slave via a bus interface means. The packet processing data path comprises a number, n, of blocks, where n is an integer. Respective blocks comprise configuration registers operable to provide information on what operation the blocks should perform for the current packet field being processed. The bus interface means comprises a first register operable to control a bus of Update Enable signals, which bus is also connected to the n blocks. The bus interface means also comprises a second register operable to control a Mode signal, which is also connected to the n blocks.

27 Claims, 7 Drawing Sheets

FIG 1 PRIOR ART

PRIOR ART

FIG 3

| Block | Register | Function |
|---|---|---|
| RF interface | Bit_Count | Number of bits to transfer to / from RF interface. For receive direction, causes data to start flowing through the datapath. |
| FEC | FEC_Type | Type of error correction coding (none, 1/3 FEC, 2/3 FEC) |
| CRC | CRC_Type | Type of CRC (none, 8 bits, 16 bits) |
| | CRC_reset | Resets the CRC calculation at the start of the packet field if set true. |
| | CRC_end | When set true, indicates that this is the last field over which the CRC is calculated, and that the checksum should be appended to / stripped from the field. |
| DMA endpoint | Byte_Count | Number of bytes to transfer to / from memory. For transmit direction, causes data to start flowing the datapath. |

PRIOR ART

FIG 4

| | DMA Endpoint | CRC | | | FEC | RF interface |
|---|---|---|---|---|---|---|
| | Byte_Count | CRC_Type | CRC_Reset | CRC_end | FEC_Type | Bit_Count |
| Header | 1 | 8 bit | True | True | 1/3 | 54 |
| HV1 voice | 10 | None | X | X | 1/3 | 240 |
| HV2 voice | 20 | None | X | X | 2/3 | 240 |
| HV3 voice | 30 | None | X | X | None | 240 |
| EV3 voice | EVbytes | 16 bit | True | True | None | EVbits |
| EV4 voice | EVbytes | 16 bit | True | True | 2/3 | EVbits |
| EV5 voice | EVbytes | 16 bit | True | True | None | EVbits |
| DH1 payload header | 1 | 16 bit | True | False | None | 8 |
| DM1 payload header | 1 | 16 bit | True | False | 2/3 | 12 |
| DH3/5 payload header | 2 | 16 bit | True | False | None | 16 |
| DH3/5 payload header | 2 | 16 bit | True | False | None | 24 |
| DHx payload | N | 16 bit | False | True | None | 8*N+24 |
| DMx payload | N | 16 bit | False | True | 2/3 | 12*N+24 |
| AUX1 payload header | 1 | None | X | X | 2/3 | 12 |
| AUX1 payload | N | None | X | X | 2/3 | 12*N |

SYSTEM AND A METHOD FOR CONSTRUCTING AND DECONSTRUCTING DATA PACKETS

REFERENCE TO RELATED APPLICATIONS

This application claims the benefit of the priority date of European application EP 05 008 911.9, filed on Apr. 22, 2005, the contents of which are herein incorporated by reference in their entirety.

FIELD OF THE INVENTION

System and method for constructing and deconstructing data packets, and at least one computer program for constructing and deconstructing data packets.

BACKGROUND OF THE INVENTION

Many communications protocols are based on the transmission and reception of information coded into so-called 'packets'. Such packets consist of a number of defined fields, and the protocol defines the content of such fields for transmitting a particular item of data. An important part of communication equipment is therefore an apparatus for constructing and deconstructing such packets.

Figure 1:
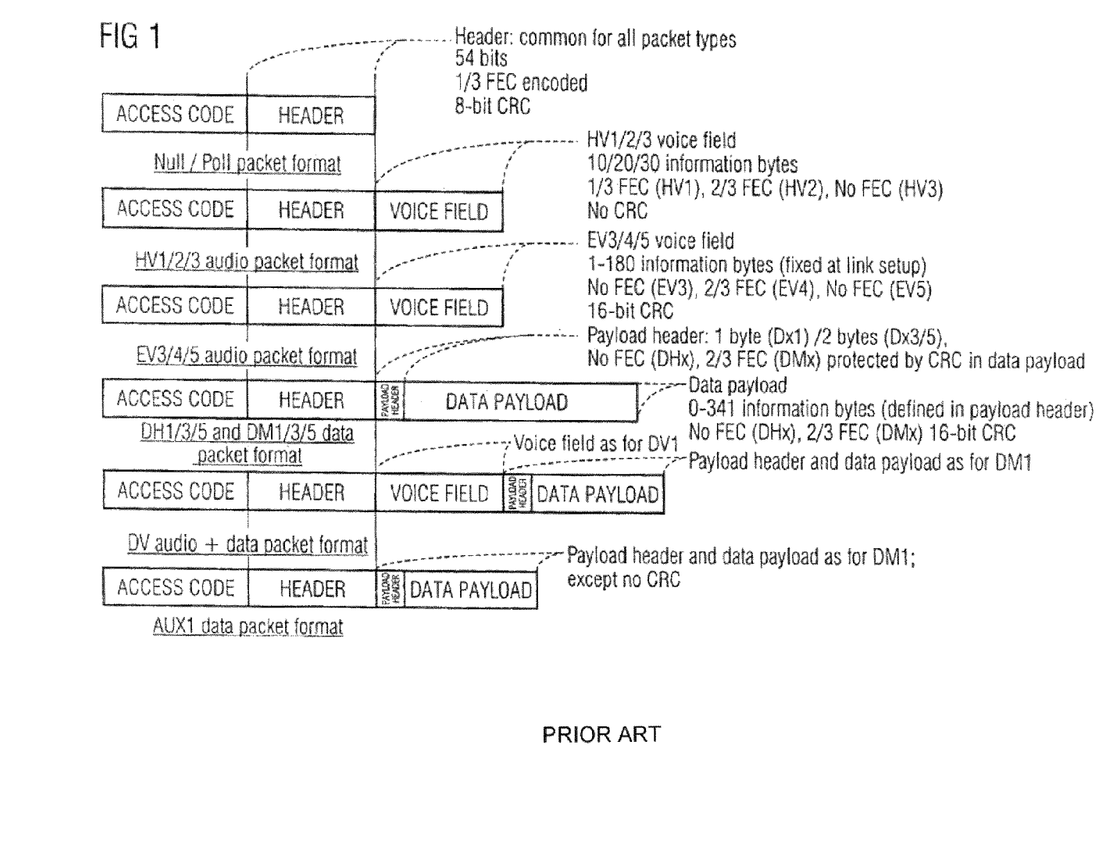
FIG. 1 illustrates different examples of Bluetooth® packet types.

As an example, some of the different packet types for the Bluetooth® standard are shown in FIG. 1. The packets begin with an access code field which allows the receiver to discriminate the beginning of the transmission. This carries no other information content. The packets also include a header field: amongst other things, this identifies the type of packet. This part of the packet is protected against transmission errors with a rate 1/3 error correcting code (FEC), and remaining errors are detected by an 8-bit CRC check.

What follows next then depends on the type of packet: for packet types Null and Poll, there is no other information. For other packet types, there are one or more subsequent information fields carrying different types of data.

Depending on packet type, these are encoded with different types of error correcting codes and may or may not contain a CRC field to check for errors. The length (number of bytes) of subsequent fields may be defined by the packet type (e.g. HVx packet types), may be pre-defined by some prior negotiation (e.g EVx packet types), or may be variable and defined by a further information field (e.g. the payload header for packet types with a data payload).

The apparatus for constructing and deconstructing such packets must therefore be capable of supporting a number of different coding formats. Particularly in the receive direction, there are often hard real time constraints and it is necessary to rapidly interpret the contents of one information field in order to re-configure the packet deconstruction apparatus to process the following sections. Due to the time constraints, and also due to the requirements for low power consumption for portable data communication systems such as Bluetooth®, it is common to design a dedicated hardware packet processing datapath block for performing the bit-level operations.

Communication standards are always in a state of rapid evolution, and the pressure to achieve a fast time-to-market for updated versions of a standard requires that a communications product be designed with flexibility in mind. Typically, this is achieved by having the key decision-making processes performed by software running on a general purpose micro-processor embedded in the communications product. An update to the standard (e.g. a new packet type) can then often be catered for by a pure software upgrade. This also provides for protection against errors in design, since hardware errors in the packet processing datapath can often be corrected by intervention from the microprocessor via a work-around in the software.

Figure 2:
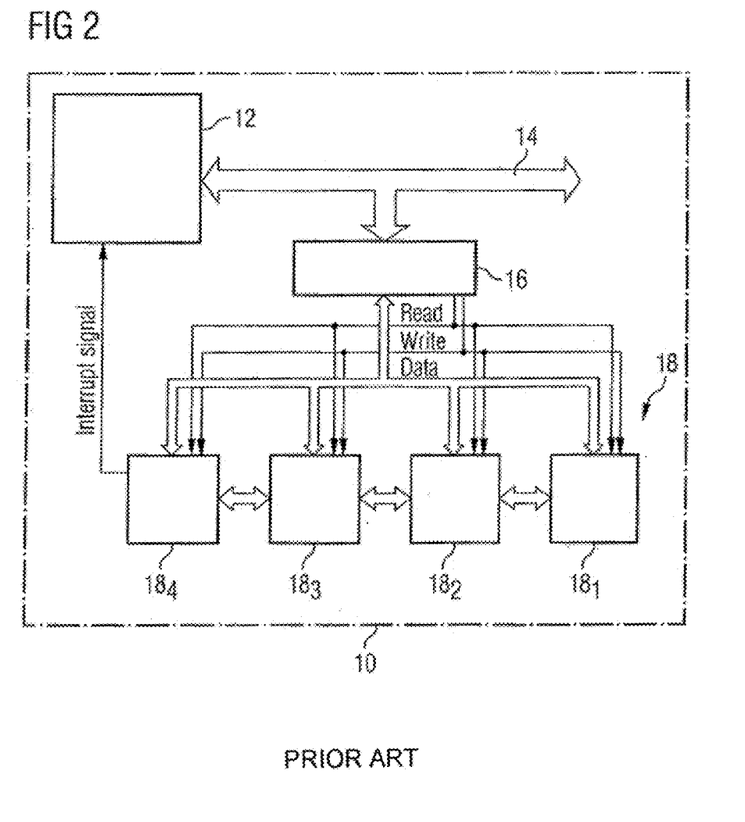
FIG. 2 illustrates a block diagram of a conventional system for constructing and deconstructing data packets.

A simple example of such a system 10 is shown in FIG. 2. This comprises a microprocessor 12 with its own bus system 14, 16 and a packet processing datapath 18 consisting of an RF interface $18_1$ (which transfers data to and from the radio), a FEC block $18_2$ (which performs error correction coding or decoding), a CRC block $18_3$ (which generates or checks a CRC code) and a DMA endpoint $18_4$ (which requests that information bytes be transferred to or from system memory via direct memory access, and issues an interrupt to the processor when the required number of bytes have been transferred).

Figure 3:
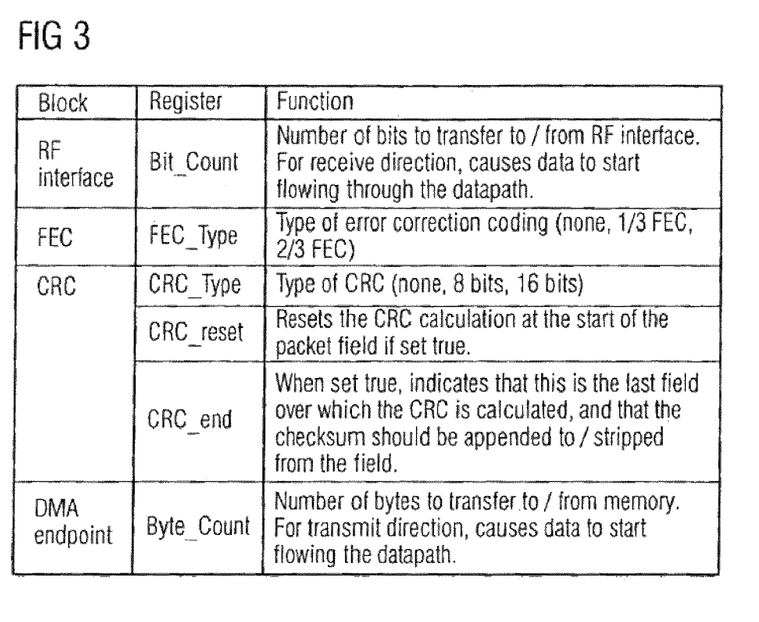
FIG. 3 illustrates examples of configuration registers comprised in the system illustrated in FIG. 2.
Figure 4:
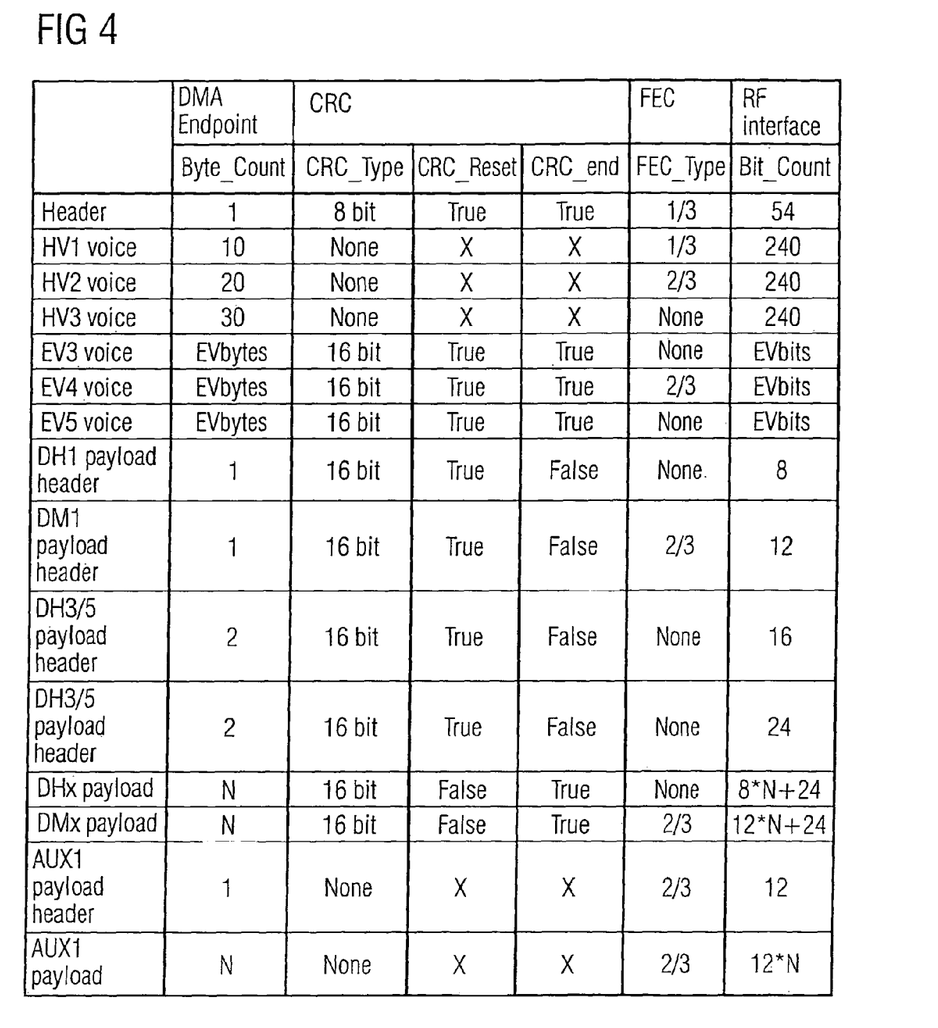
FIG. 4 illustrates examples of register configurations for different packet fields.

Respective block in the packet processing datapath 18 communicates with its neighbors, and contains configuration registers which provide information on what operation the block should perform for the current packet field being processed. An example of a possible register definition for the simple example datapath is shown in FIG. 3. It should be noted that a practical implementation is likely to contain both more functional blocks and more configuration registers per block. The packet processing datapath 18 is attached to the bus as a slave via a bus 14 interface block 16. This decodes the bus protocol and performs write or read operations to the configuration registers.

For the case of reception of Bluetooth® packets, the microprocessor would first configure the datapath for reception of the header field. For the simple example datapath, this would require 7 programming operations over the microprocessor bus. The Bit_Count field for the RF interface would be programmed last, since this would have the side-effect of causing data to begin to flow through the datapath. Once the header is received, the microprocessor would receive an interrupt from the end-point. It would then read the packet type from the header. Depending on the packet type, it would be necessary to reprogram some or all of the registers for the subsequent field, and repeat this for every subsequent field. For example, a DH1 packet would first require that the datapath be programmed to receive the payload header. Then, the datapath would need to be reprogrammed to receive the payload body.

The example datapath has a fairly trivial number of configuration registers. In a practical hardware implementation there are likely to be considerably more registers. Also, there may be a number of wait states introduced in gaining access to the registers. This means that such reprogramming can take a significant amount of time (from the system viewpoint). As mentioned previously, decisions during reception are often time-critical. The time taken to do the reprogramming means that there is less time left and therefore there is less flexibility to implement software work-arounds. The alternative is to increase the clock frequency to reduce the time taken, which has an effect on system power consumption.

Additionally, a microprocessor (and associated ROM and RAM memories) consumes significant amounts of energy when active. Typically, in an event-driven system such as that described, the processor will be shut down when there are no tasks to perform and will consume almost no energy. Once the "intelligence" of the microprocessor has been used to make a decision about what type of field is to come next, it is wasteful of energy for the processor to perform the manual process of updating respective of the registers.

SUMMARY OF THE INVENTION

The following presents a simplified summary in order to provide a basic understanding of one or more aspects and/or embodiments of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

A system for constructing and deconstructing data packets is disclosed, wherein the system is operable to support a number of different coding formats. In one example the system comprises a processor means operatively coupled to a processor bus. The system also comprises a packet processing data path which is attached to the processor bus as a slave via a bus interface means. The packet processing data path comprises a number, n, of blocks, wherein n is an integer. Respective blocks comprise configuration registers operable to provide information on what operation the block should perform for said current packet field being processed. The bus interface means comprises a first register operable to control a bus of Update Enable signals, which bus also is connected to the n blocks. The bus interface means also comprises a second register operable to control a Mode signal, which also are connected to the n blocks. An Update Mode signal is connected to the bus interface means, and to the n blocks. A write to the second register causes the Update Mode signal to be pulsed active, triggering the enabled configuration registers to update their values.

The system achieves a way of controlling a datapath, that retains advantages of full programmability while mitigating processor intervention in normal operation. The microprocessor is used for the tasks, e.g. making decisions, in which it is most efficient, while mitigating time and energy consumption for updating configuration registers.

In one example respective blocks of said packet processing data path are connected to and communicate with block neighbors.

Furthermore, said bus interface means may be operable to decode the bus protocol and perform write or read operations to said configuration registers.

Said system may also comprise a further set of registers operable to enable or disable the update of said configuration registers.

Furthermore, said system may also comprise additional registers operable to store pre-defined modes for respective configuration registers, wherein complete mode definitions, for respective configuration registers, comprise whether said configuration registers should be updated, and if so what value the registers should be set to.

A pre-defined mode for respective configuration registers may be hard-wired, wherein complete mode definitions, for respective configuration registers, comprise whether the configuration registers should be updated, and if so what values the registers should be set to.

Furthermore, said system may also comprise additional registers operable to store pre-defined modes for some of said configuration registers, and in that a pre-defined mode for the remaining of said configuration registers is hard-wired, wherein complete mode definitions, for respective configuration registers, comprise whether said configuration registers should be updated, and if so what values the registers should be set to.

Said packet processing data path may comprise an RF interface block operable to transfer data to and from a radio, a FEC block operable to perform error correction coding or decoding, a CRC block operable to generate or check a CRC code, and a DMA endpoint block which is connected to said processor means, and operable to request that information bytes be transferred to or from a memory means, comprised in said system, via direct memory access, and to issue an interrupt signal to said processor means when the required number of bytes have been transferred.

Furthermore, said RF interface block may comprise a Bit-Count configuration register operable to store the number of bits to transfer to or from said RF interface block, and in the receive direction, to cause data to start flowing through said packet processing data path.

Said FEC block may comprise a FEC-Type configuration register operable to store the type of error correction coding.

Said CRC block may comprise a CRC-Type configuration register operable to store the type of CRC, a CRC-reset configuration register operable to reset the CRC calculation at the start of the packet field if set true, and a CRC-end configuration register operable, when set true, to indicate that this is the last field over which the CRC is calculated, and that the checksum should be appended to/stripped from said field.

Said DMA endpoint block may comprise a Byte-Count configuration register operable to store the number of bytes to transfer to/from said memory means, and in the transmit direction, to cause data to start flowing through said packet processing data path.

A method is also disclosed for constructing and deconstructing data packets with the aid of a system operable to support a number of different coding formats. In one example the system comprises a processor means operatively coupled to a packet processing data path, which is attached to a processor bus as a slave via a bus interface means. The packet processing data path comprises a number, n, of blocks, wherein n is an integer. Respective blocks comprise configuration registers operable to provide information on what operation the block should perform for the current packet field being processed. The bus interface means comprises a first register, and a second register. The method comprises transmitting via the processor means a write signal to said second register which then transmits a Mode signal to respective blocks. The method also comprises transmitting with the aid of said first register Update Enable signals to said configuration registers that are defined to be updated for the new mode. Additionally, as a consequence of said write signal, an Update Mode signal is pulsed active. Also, said enabled configuration registers are triggered to update their values in parallel to transmit said active Update Mode signal to said n blocks.

The method achieves a way of controlling a datapath that retains advantages of full programmability while mitigating required processor intervention in normal operation. The microprocessor is used for the tasks, e.g. making decisions, in which it is most efficient, while mitigating time and energy consumption for updating configuration registers.

The method may also comprise enabling or disabling the update of said configuration registers with the aid of a further set of registers comprised in said system.

The method may also comprise, with the aid of additional registers comprised in said system, storing a pre-defined mode for respective configuration registers, wherein complete mode definitions, for respective configuration registers, comprise whether said configuration registers should be updated, and if so what values the registers should be set to.

The method may also comprise hard-wiring a pre-defined mode for respective configuration registers, wherein complete mode definitions, for respective configuration registers, comprise whether said configuration registers should be updated, and if so what value the registers should be set to.

The method may also comprise, with the aid of additional registers comprised in said system, storing pre-defined modes for some of said configuration registers and hard-wiring predefined modes for the remaining of said configuration registers, wherein complete mode definitions, for respective configuration registers, comprise whether said configuration registers should be updated, and if so what value the registers should be set to.

The respective blocks of said packet processing data path may be connected to and operable to communicate with neighboring blocks.

The method may also comprise, with the aid of an RF interface block comprised in said packet processing data path, transferring data to and from a radio, with the aid of a FEC block comprised in said packet processing data path, performing error correction coding or decoding, with the aid of CRC block comprised in said packet processing data path, generating or checking a CRC code, with the aid of a DMA endpoint block comprised in said packet processing data path, requesting that information bytes be transferred to or from a memory means comprised in said system, via direct memory access, and issuing an interrupt signal to said processor means when the required number of bytes have been transferred.

The method may also comprise, with the aid of a Bit-Count configuration register comprised in said RF interface block, storing the number of bits to transfer to or from said RF interface block, and in the receive direction, causing data to start flowing through said packet processing data path.

The method may also comprise, with the aid of a FEC-Type configuration register comprised in said FEC block, storing the type of error correction coding.

The method may also comprise, with the aid of a CRC-Type configuration register comprised in said CRC block, storing the type of CRC, with the aid of a CRC-reset configuration register comprised in said CRC block, resetting the CRC calculation at the start of the packet field if set true, and with the aid of a CRC-end configuration register comprised in said CRC block, when set true, indicating that this is the last field over which the CRC is calculated, and that the checksum should be appended to/stripped from said field.

The method may also comprise, with the aid of a Byte-Count configuration register comprised in said DMA endpoint block, storing the number of bytes to transfer to/from said memory means, and in the transmit direction, causing data to start flowing through said packet processing data path.

At least one computer program product for constructing and deconstructing data packets is also disclosed. The at least one computer program product is loadable into internal memory of at least one digital computer. The computer program product(s) comprise software code portions for performing a methodology set forth herein.

The computer program product(s) provide a way of controlling a datapath that retains the advantages of full programmability while mitigating the required processor intervention in normal operation. The microprocessor is used for the tasks, e.g. making decisions, in which it is most efficient, while mitigating time and energy consumption for updating configuration registers.

BRIEF DESCRIPTION OF THE DRAWINGS

The invention is explained in more detail below wherein reference is made to the following drawings.

DETAILED DESCRIPTION OF THE INVENTION

One or more examples of the present invention will now be described with reference to the drawing figures, wherein like reference numerals are used to refer to like elements throughout. It should be understood that the drawing figures and following descriptions are merely illustrative and that they should not be taken in a limiting sense. In the following description, for purposes of explanation, numerous specific details are set forth in order to provide a thorough understanding. It will be appreciated that variations of the illustrated systems and methods apart from those illustrated and described herein may exist and that such variations are deemed as falling within the scope of the appended claims.

Figure 5:
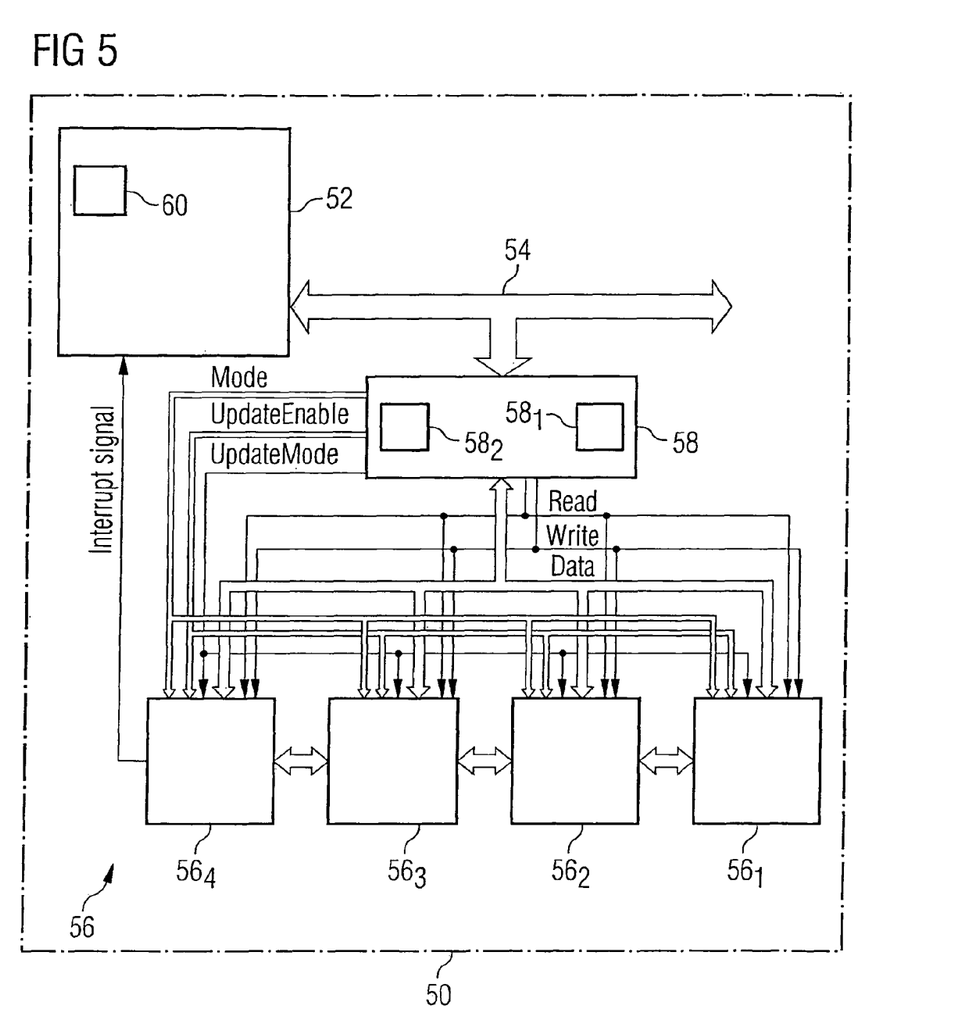
FIG. 5 is a block diagram illustrating an example of a system for constructing and deconstructing data packets as described herein.

Turning to FIG. 5, a block diagram illustrates an example of a system 50 for constructing and deconstructing data packets. The system 50 is operable to support a number of different coding formats. The system 50 comprises a processor means 52 operatively coupled to a processor bus 54. The system 50 also comprises a packet processing data path 56 connected to the processor means 52. The packet processing data path 56 is also attached to the processor bus 54 as a slave via a bus interface means 58. The packet processing data path 56 comprises a number, n, of blocks $56_1$-$56_n$, wherein n is an integer. In the packet processing data path 56 disclosed in FIG. 5, there are four blocks $56_1$-$56_4$. Respective block $56_1$-$56_4$ comprise configuration registers (not shown in FIG. 5) operable to provide information on what operation the block $56_1$-$56_4$ should perform for the packet field being processed. The bus interface means 58 comprises a first register $58_1$ operable to control a bus of Update Enable signals, which bus also is connected to the four blocks $56_1$-$56_4$. The bus interface means 58 also comprises a second register $58_2$ operable to control a Mode signal, which also is connected to the four blocks $56_1$-$56_4$. As also is apparent in FIG. 5, an Update Mode signal is connected to the bus interface means 58 and to the four blocks $56_1$-$56_4$. A write to the second register $58_2$ causes the Update Mode signal to be pulsed active, which will trigger the enabled configuration registers to update their values. As also is apparent from FIG. 5, respective blocks $56_1$; $56_2$; $56_3$; $56_4$ of the packet processing data path 56 is connected to and communicates with its block neighbors. The bus interface means 58 is operable to decode the bus protocol and perform write or read operations to the configuration registers.

The system 50 may also comprise a further set of registers operable to enable or disable the update of the configuration registers.

The system 50 may also comprise additional registers operable to store pre-defined modes for respective configuration registers. Mode definitions, for respective configuration registers, comprise whether the configuration register should be updated, and if so what values the registers should be set to.

In one example, pre-defined modes for respective configuration registers are hard-wired.

The system 50 may also comprise additional registers operable to store pre-defined modes for at least some of the configuration registers.

The packet processing data path 56 may comprise an RF interface block 56$_1$, operable to transfer data to and from a radio, a FEC block 56$_2$ operable to perform error correction coding or decoding, a CRC block 56$_3$ operable to generate or check a CRC code, and a DMA endpoint block 56$_4$ which is connected to the processor means 52, and operable to request that information bytes be transferred to or from a memory means 60, comprised in the system 50 (see FIG. 5), via direct memory access, and to issue an interrupt signal to the processor means 52 when the required number of bytes have been transferred.

The RF interface block 56$_1$ may comprise a Bit Count configuration register operable to store the number of bits to transfer to or from the RF interface block 56$_1$, and in the receive direction, to cause data to start flowing through the packet processing data path 56.

The FEC block 56$_2$ may comprise a FEC-Type configuration register operable to store the type of error correction coding.

The CRC block 56$_3$ may comprise a CRC-Type configuration register operable to store the type of CRC, a CRC-reset configuration register operable to reset the CRC calculation at the start of the packet field if set true, and a CRC-end configuration register operable, when set true, to indicate that this is the last field over which the CRC is calculated, and that the checksum should be appended to/stripped from the field.

The DMA endpoint block 56$_4$ may comprise a Byte-Count configuration register operable to store the number of bytes to transfer to/from the memory means 60, and in the transmit direction, to cause data to start flowing through the data processing data path 56.

Figure 6:
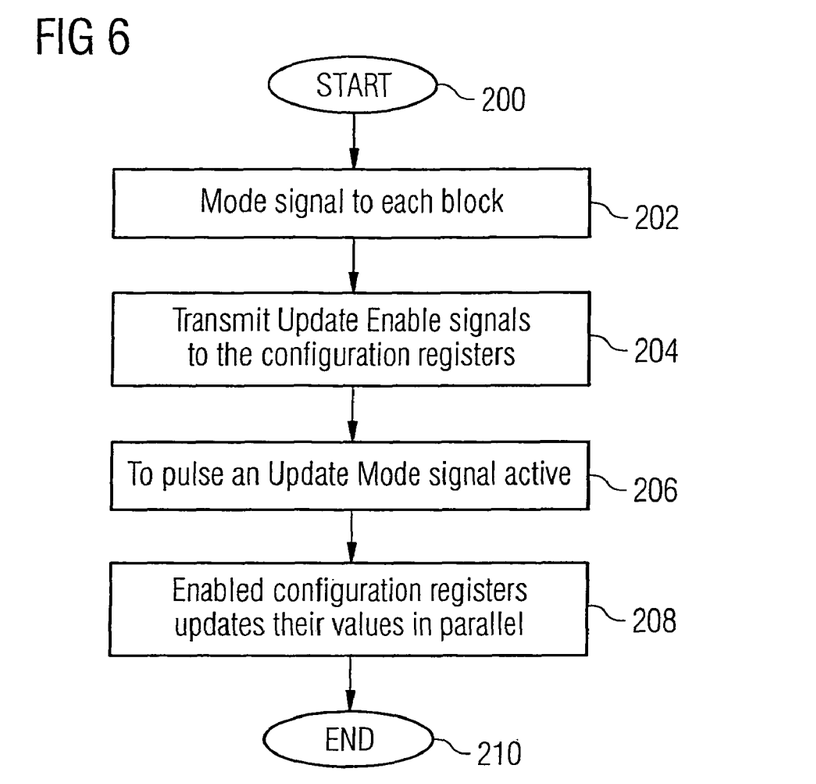
FIG. 6 is a flow chart illustrating a method for constructing and deconstructing data packets as described herein.

Turning to FIG. 6, a flow chart illustrates a method for constructing and deconstructing data packets. While the method is illustrated and described below as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated acts may be required for implementation. Further, one or more of the acts depicted herein may be carried out in one or more separate acts and/or phases.

The method may be carried out in a system operable to support a number of different coding formats. Such a system may correspond to the system 50 illustrated in FIG. 5, for example, which system 50 comprises a processor means 52 operatively coupled to a processor bus 54 and a packet processing data path 56 which is attached to the processor bus 54 as a slave via a bus interface means 58. The packet processing data path 56 comprises a number, n, of blocks 56$_1$; ... ; 56$_n$, wherein n is an integer. Respective block 56$_1$; ... ; 56$_n$ are operable to provide information on what operation the block 56$_1$; ... ; 56$_n$ should perform on the packet field being processed. The bus interface means 58 comprises a first register 58$_1$, and a second register 58$_2$. The method begins at 200 and continues to 202 where, with the aid of the processor means 52, a write signal is transmitted to the second register 58$_2$, which then transmits a Mode signal to respective blocks 56$_1$; ... ; 56$_n$. Thereafter, the method continues at 204, with the aid of the first register 58$_1$, to transmit Update Enable signals to the configuration registers that are defined to be updated for the new mode. Then, at 206, as a consequence of the write signal, an Update Mode signal is pulsed active. Thereafter, at 208 the active Update Mode signal is transmitted to the n blocks 56$_1$; ... ; 56$_n$, triggering the enabled configuration registers to update their values in parallel. The method ends at 210.

The method may also comprise enabling or disabling the update of the configuration registers with the aid of a further set of registers comprised in the system 50.

The method may also comprise, with the aid of additional registers comprised in the system 50, storing pre-defined modes for respective configuration registers, wherein complete mode definitions, for respective configuration registers, comprises whether the configuration registers should be updated, and if so what values the registers should be set to.

The method may also comprise hard-wiring pre-defined modes for respective configuration registers.

The method may also comprise, with the aid of additional registers comprised in the system 50, storing pre-defined modes for at least some of the configuration registers, and hard-wiring pre-defined modes for at least some of the configuration registers.

In one example, a block 56$_x$ of the packet processing data path 56 is connected to and is operable to communicate with its neighbors, e.g. blocks 56$_{x-1}$, 56$_{x+1}$.

The method may also comprise, with the aid of an RF interface block 56$_1$ comprised in the packet processing data path 56, transferring data to and from a radio, with the aid of a FEC block 56$_2$ comprised in the packet processing data path 56, performing error correction coding or decoding, with the aid of CRC block 56$_3$ comprised in the packet processing data path 56, generating or checking a CRC code, with the aid of a DMA endpoint block 56$_n$ comprised in the packet processing data path 56, requesting that information bytes be transferred to or from a memory means 60 comprised in the system 50 via direct memory access, and issuing an interrupt signal to the processor means 52 when the required number of bytes have been transferred.

The method may also comprise, with the aid of a Bit-Count configuration register comprised in the RF interface block 56$_1$, storing the number of bits to transfer to or from the RF interface block 56$_1$, and in the receive direction, causing data to start flowing through the packet processing data path 56.

The method may also comprise, with the aid of a FEC-Type configuration register comprised in said FEC block 56$_2$, storing the type of error correction coding.

The method may also comprise, with the aid of a CRC-Type configuration register comprised in the CRC block 56$_3$, storing the type of CRC, with the aid of a CRC-reset configuration register comprised in the CRC block 56$_3$, resetting the CRC calculation at the start of the packet field if set true, and with the aid of a CRC-end configuration register comprised in the CRC block 56$_3$, when set true, indicating that this is the last field over which the CRC is calculated, and that the checksum should be appended to/stripped from said field.

The method may also comprise, with the aid of a Byte-Count configuration register comprised in the DMA endpoint block 56$_n$, storing the number of bytes to transfer to/from the memory means 60, and in the transmit direction, causing data to start flowing through the packet processing data path 56.

The disclosure herein is stated in additional terms as follows. A modified datapath is described, and a method for controlling it that retains advantages of full programmability while mitigating required processor intervention in normal operation.

At the time of designing the datapath hardware and/or releasing the software for the device, the protocol to be implemented should be defined (even if it is expected to change in some details at a later stage). This means that values for configuration registers for most or all of the different fields of the different packet types can be defined in advance. These pre-defined configurations or 'modes' can be stored in the different processing blocks of the datapath. Complete 'mode' definitions comprise, for respective configuration registers, whether particular registers should be updated and if so what values the registers should be set to.

Per-mode settings for respective configuration registers can be stored either in additional registers (which are programmed only once at start-up) or the configurations can be hard-wired. The register-based approach provides flexibility, at the expense of additional hardware. A mixture of the two approaches may be desired: all or part of the configuration for a particular mode can be contained in registers, depending on the probability that a particular configuration register will need to be changed subsequently.

To receive a certain field of a packet, the microprocessor programs a single register, which selects the appropriate mode and simultaneously informs datapath blocks of the change to the new mode. Respective datapath blocks then update those configuration registers that are defined to be updated for this new mode. Should there be further changes that are unique to respective packets (e.g. the length of the data payload) then these can be written individually after the main mode change.

To maintain flexibility for future protocol changes or workarounds, the method can be enhanced by a further set of registers which enables or disables the update of configuration registers. Respective configuration could be represented by a single bit, and therefore a single write to a 32-bit register could select 32 different configuration registers to be updated or not. For example, a Bit_Count register has the side effect of causing data to start being fed through the datapath. If there is a requirement to change the number of bits in a particular field (or to support a new type of field), then the processor can clear the relevant bit in the register before selecting the affected mode. The processor can then update Bit_Count according to the new requirement.

If there is a mode (particularly a rarely used one) that differs slightly from another mode, then the less commonly used mode can be made a special case of another mode. For example, AUX1 packets are very similar to DM1 packets with the exception that no CRC is applied to the payload. In this case, the processor would select the appropriate DM1 mode, and then reprogram the CRC configuration to "No CRC".

Figure 7:
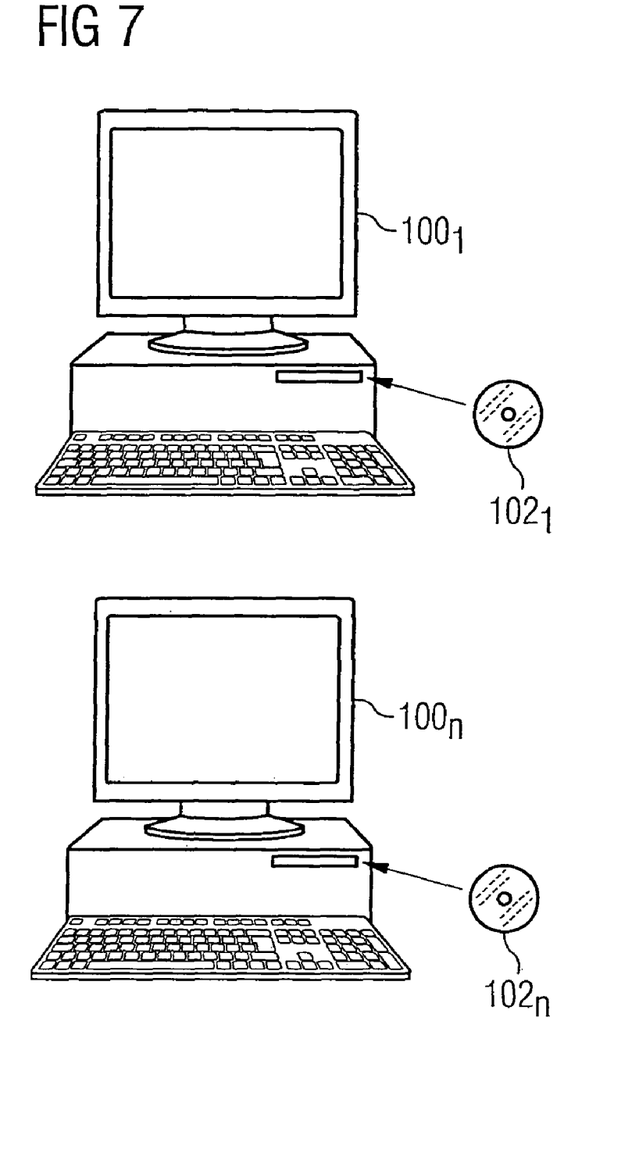
FIG. 7 is a schematic diagram illustrating computer program products as described herein.

Turing to FIG. 7, a schematic diagram illustrates one or more computer program products for constructing and deconstructing data packets. This is disclosed relative to different digital computers $100_1, \ldots, 100_n$, wherein n is an integer. N different computer program products $102_1, \ldots, 102_n$, are illustrated in the form of compact discs. The different computer program products $102_1, \ldots, 102_n$ are directly loadable into the internal memory of the n different digital computers $100_1, \ldots, 100_n$. Respective computer program product $102_1, \ldots, 102_n$ may comprise software code portions for performing some or all of the actions described above with regard to FIG. 6 when the product(s) $102_1, \ldots, 102_n$ is/are run on said computer(s) $100_1, \ldots, 100_n$. The computer program products $102_1, \ldots, 102_n$ may, for example, be in the form of floppy disks, RAM disks, magnetic tapes, opto-magnetic disks or any other suitable computer readable mediums and/or products.

Although the invention has been illustrated and described with respect to one or more examples, equivalent alterations and modifications will occur to others skilled in the art upon the reading and understanding of this specification and the annexed drawings. In particular regard to the various functions performed by the above described components (e.g., assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure. In addition, while a particular feature may have been disclosed with respect to only one example, such feature may be combined with one or more other features as may be desired and advantageous for any given or particular application. Furthermore, to the extent that the term "includes" is used in either the detailed description or the claims, such term is intended to be inclusive in a manner similar to the term "comprising." Also, "exemplary" is merely intended to mean an example, rather than "the best".

The invention claimed is:

1. A system for constructing and deconstructing data packets, comprising:
    a processing data path comprising a number, n, of processing blocks, respective processing blocks comprising configuration registers for storing information on an operation to be performed by the processing blocks for a current packet field being processed; and
    a bus interface means comprising a first register for controlling a bus of Update Enable signals being receivable by the number of processing blocks, and a second register for controlling a Mode signal being receivable by the number of processing blocks, the bus interface means providing an Update Mode signal to the number of processing blocks, wherein a write to the second register causes the Update Mode signal to be pulsed active triggering the enabled configuration registers to update their values.

2. The system of claim 1, further comprising:
    a processor means operatively coupled to a processor bus, the processing data path being operatively coupled to the processor means, and the packet processing data path being operatively coupled to the processor bus as a slave via a bus interface means, the system being configured to support a number of different coding formats.

3. The system of claim 1, where respective processing blocks comprise configuration registers configured to provide information on what operation the blocks should perform.

4. The system of claim 1, where respective blocks of said packet processing data path are connected to and communicating with neighboring blocks.

5. The system of claim 4, the processing data path further comprising an RF interface block configured to transfer data to and from a radio, a FEC block configured to perform error correction coding or decoding, a CRC block configured to generate or check a CRC code, and a DMA endpoint block connected to a processor means and configured to request that information bytes be transferred to or from a memory means comprised in the system, via direct memory access, and to issue an interrupt signal to the processor means when the required number of bytes have been transferred.

6. The system of claim 5, the RF interface block comprising a Bit-Count configuration register configured to store the number of bits to transfer to and/or from the RF interface block, and in the receive direction, to cause data to start flowing through the processing data path.

7. The system of claim 5, the FEC block comprising a FEC-Type configuration register configured to store the type of error correction coding.

8. The system of claim 5, the CRC block comprising a CRC-Type configuration register configured to store the type of CRC, a CRC-reset configuration register configured to reset the CRC calculation at the start of the packet field if set true, and a CRC-end configuration register configured, when set true, to indicate that this is the last field over which the CRC is calculated, and that the checksum should be appended to/stripped from the field.

9. The system of claim 5, the DMA endpoint block comprising a Byte-Count configuration register configured to store the number of bytes to transfer to/from the memory means, and in the transmit direction, to cause data to start flowing through the processing data path.

10. The system of claim 1, where the bus interface means is configured to decode a bus protocol and perform write and/or read operations to the configuration registers.

11. The system of claim 1, further comprising: a further set of registers configured to enable and/or disable the update of the configuration registers.

12. The system of claim 1, further comprising: additional registers configured to store pre-defined modes for respective configuration registers, wherein complete mode definitions, for respective configuration registers comprise whether the configuration registers should be updated, and if so what values the registers it should be set to.

13. The system of claim 1, where pre-defined modes for respective configuration registers are hard-wired, and where complete mode definitions, for respective configuration registers, comprise whether the configuration registers should be updated, and if so what values the registers should be set to.

14. The system of claim 1, further comprising: additional registers configured to store pre-defined modes for at least some of the configuration registers, and where pre-defined modes for configuration registers are also hard-wired, wherein complete mode definitions, for respective configuration registers, comprise whether the configuration registers should be updated, and if so what values the registers should be set to.

15. A method for constructing and deconstructing data packets with the aid of a system, the system comprising a processing data path and a bus interface means, the processing data path comprising a number, n, of processing blocks, a processing block comprising configuration registers storing information on an operation to be performed by the processing block for a current packet field being processed, the method comprising:
    with the aid of a first register of the bus interface means, controlling a bus of Update Enable signals being receivable by the number of processing blocks; with the aid of a second register of the bus interface means, controlling a Mode signal being receivable by the number of processing blocks;
    with the aid of the bus interface means, providing an Update Mode signal to the number of processing blocks, wherein a write to the second register causes the Update Mode signal to be pulsed active triggering the enabled configuration registers to update their values.

16. A method for constructing and deconstructing data packets with the aid of a system, which system comprises a bus interface means and a packet processing data path, wherein the packet processing data path comprises a number, n, of blocks, wherein n is an integer, wherein respective blocks comprise configuration registers configured to provide information on what operation the blocks should perform for the current packet field being processed, the bus interface means comprising a first register and a second register, the method comprising:
    with the aid of a processor means, transmitting a write signal to the second register which then transmits a Mode signal to respective blocks;
    with the aid of the first register, transmitting Update Enable signals to the configuration registers that are defined to be updated for a new mode;
    as a consequence of the write signal, pulsing an Update Mode signal active; and
    transmitting the active Update Mode signal to the n blocks, triggering the enabled configuration registers to update their values in parallel.

17. The method of claim 16, the system being configured to support a number of different coding formats, the system comprising the processor means operatively coupled to a processor bus, the packet processing data path being connected to the processor means, the packet processing data path being attached to the processor bus as a slave via the bus interface means.

18. The method of claim 16, further comprising: enabling or disabling the update of the configuration registers with the aid of a further set of registers comprised in the system.

19. The method of claim 16, further comprising: with the aid of additional registers comprised in the system, storing pre-defined modes for respective configuration registers, wherein complete mode definitions, for respective configuration registers, comprise whether the configuration registers should be updated, and if so what values the registers should be set to.

20. The method of claim 16, further comprising: hard-wiring pre-defined modes for respective configuration registers, wherein complete mode definitions, for respective configuration registers, comprise whether the configuration registers should be updated, and if so what values the registers should be set to.

21. The method of claim 16, further comprising: with the aid of additional registers comprised in the system, storing a pre-defined mode for some of the configuration registers; and hard-wiring a predefined mode for the remaining of the configuration registers, wherein complete mode definitions, for respective configuration registers, comprise whether the configuration registers should be updated, and if so what value the registers should be set to.

22. The method of claim 16, where respective blocks of the packet processing data path are operatively coupled to and able to communicate with neighboring blocks.

23. The method of claim 22, further comprising: with the aid of an RF interface block comprised in the packet processing data path, transferring data to and from a radio; with the aid of a FEC block comprised in the packet processing data path, performing error correction coding and/or decoding; with the aid of CRC block comprised in the packet processing data path, generating and/or checking a CRC code; with the aid of a DMA endpoint block comprised in the packet processing data path, requesting that information bytes be transferred to and/or from a memory means comprised in the system, via direct memory access; and issuing an interrupt signal to the processor means when the required number of bytes have been transferred.

24. The method of claim 22, further comprising: with the aid of a Bit-Count configuration register comprised in the RF interface block, storing the number of bits to transfer to or from the RF interface block; and in the receive direction, causing data to start flowing through the packet processing data path.

25. The method of claim 22, further comprising: with the aid of a FEC-Type configuration register comprised in the FEC block, storing the type of error correction coding.

26. The method of claim 22, further comprising: with the aid of a CRC-Type configuration register comprised in the CRC block, storing the type of CRC; with the aid of a CRC-reset configuration register comprised in the CRC block, resetting the CRC calculation at the start of the packet field if set true; and with the aid of a CRC-end configuration register comprised in the CRC block, when set true, indicating that this is the last field over which the CRC is calculated, and that the checksum should be appended to/stripped from the field.

27. The method of claim 22, further comprising: with the aid of a Byte-Count configuration register comprised in the DMA endpoint block, storing the number of bytes to transfer to/from the memory means; and in the transmit direction, causing data to start flowing through the packet processing data path.

* * * * *